May 20, 1969  H. W. DEATON  3,444,882

BALANCED BRIDGE FILL SYSTEM FOR CLOTHES WASHER

Filed Dec. 2, 1966  Sheet 1 of 2

INVENTOR.
Homer W. Deaton
BY
J. C. Evans
ATTORNEY

INVENTOR.
Homer W. Deaton
BY
J. E. Evans
ATTORNEY

United States Patent Office 3,444,882
Patented May 20, 1969

3,444,882
BALANCED BRIDGE FILL SYSTEM FOR CLOTHES WASHER
Homer W. Deaton, Centerville, Ohio, assignor to General Motors Corporation, Detroit, Mich., a corporation of Delaware
Filed Dec. 2, 1966, Ser. No. 598,691
Int. Cl. E03b; F16h *21/18;* F17d
U.S. Cl. 137—392          15 Claims

ABSTRACT OF THE DISCLOSURE

In preferred form, a domestic washer fill system using the resistance of a free-falling column of fill fluid into the washer tub to terminate the supply of fluid thereto when said fluid reaches a predetermined level. The free-falling column of fluid forms one leg of a bridge circuit which produces an output signal when the bridge is unbalanced. When the fluid in the tub is at a desired operating level, the free-falling column of fluid is a desired length from a spatially placed inlet means to the top of the fluid level in said tub. The electrical resistance of the said free-falling column of fluid at this point is of a magnitude such that the bridge does not produce an output signal. Said control means, in the absence of an output signal, in combination with said fluid supply system terminates fluid flow to the said tub.

Figure 1:
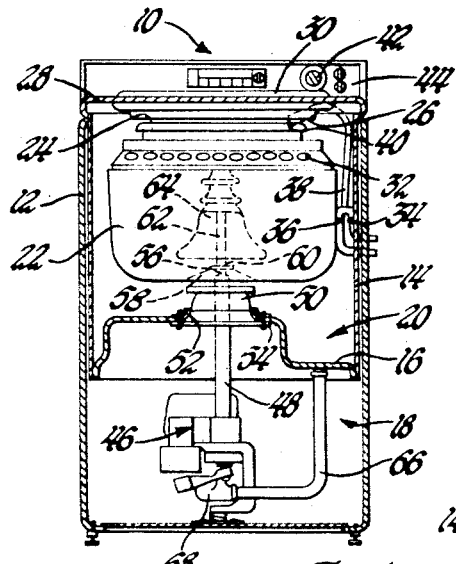

This invention is directed to fluid sensing and control systems and more particularly to a fluid sensing and control system for establisihng a predetermined fluid level in a fluid container by terminating the flow of a free-falling column of fluid thereto.

In fluid control systems it is desirable to automatically regulate termination of flow fluid into a container when the container has a predetermined level of fluid therein. A typical system of this type will include pressure sensitive switches, mechanically operated valve means and electrical sensing systems to terminate the flow of fluid into a container when the desired level of fluid occurs therein.

Many existing sensing and fill control systems are suitable for their intended purpose but they are either too expensive or complicated for use in controlling the fluid level in apparatus such as a domestic appliance and more particularly appliances such as domestic washers wherein it is desirable to control the fluid level in the washing container in accordance with the size of a soiled load being processed therein.

Accordingly, an object of the present invention is to improve positive fill control systems by the provision of a system that utilizes the variable resistance characteristics of a freely-falling column of fill fluid to terminate fluid flow upon the occurrence of a predetermined level of fluid in a fluid container component of the system.

A further object of the present invention is to improve positive fill control systems of the type including a fluid flow controller and a freely-falling column of fluid for varying the fluid level within the container by the provision of means for operating the controller to terminate fluid flow into the container in accordance with electrical properties of the column of fluid.

Still another object of the present invention is to improve fluid sensing and control systems of the type used to positively control the level of fluid within a container by the provision therein of means for establishing a fluid flow into the container including a free-falling column of fluid that varies in length in accordance with the fluid level in the container and means for terminating fluid flow in accordance with changes in the electrical resistance of the column of fluid.

Yet another object of the present invention is to improve fluid control systems for positively regulating the fluid level in domestic washing apparatus or the like by the provision of a fluid level sensing system including control means utilizing a freely-falling flow of fluid into the domestic appliance to first sense the size of the soiled load within the appliance to pre-set a desired fluid level within the machine to carry-out a washing operation and wherein thereafter the control means utilizes the length of the column of cleaning fluid to terminate the fill phase of operation when a predetermined fluid level occurs in the apparatus whereby a preselected amount of cleaning fluid is automatically obtained for removing soil from different sized loads.

Another object of the present invention is to provide an improved positive fill system for a clothes cleaning apparatus comprising a fluid container and a fluid flow supply system including a fill conduit for directing a column of fluid into the container and wherein control means are associated with the fluid supply means for sensing the length of the column of fluid flowing into the container and responding to variations in the length of the column for terminating flow into the container when a predetermined fluid level occurs therein.

Still another object of the present invention is to improve positive fill control systems for use in domestic appliances and the like wherein the apparatus includes a fluid container and a fluid supply system for directing a freely-falling column of fluid into the fluid container by the provision of control means for terminating fluid flow into the container when a predetermined fluid level occurs in a container and means for actuating the control means in accordance with the electrical resistance of the freely-falling column of fluid.

Still another object of the present invention is to produce a fill control system of the type set forth in the preceding object wherein the control means includes bridge means having a first leg formed by an enclosed fluid stream and a second leg formed by the free-falling column of fluid and wherein bridge unbalance is determined as a ratio of the length of the first and second legs of the bridge and wherein the bridge includes an output therefrom responsive to a predetermined ratio of resistances between said legs to operate valve means for terminating a fill phase of operation.

Further objects and advantages of the present invention will be apparent from the following description, reference being had to the accompanying drawings wherein a preferred embodiment of the present invention is clearly shown.

Figure 2:
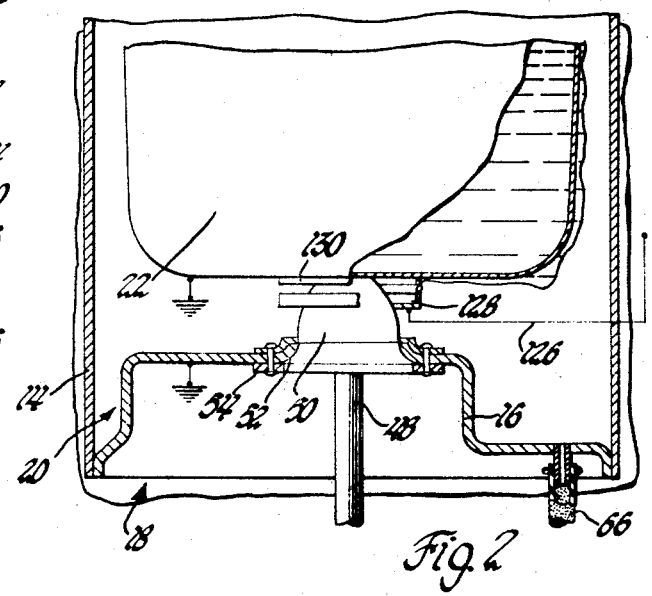
Figure 3:
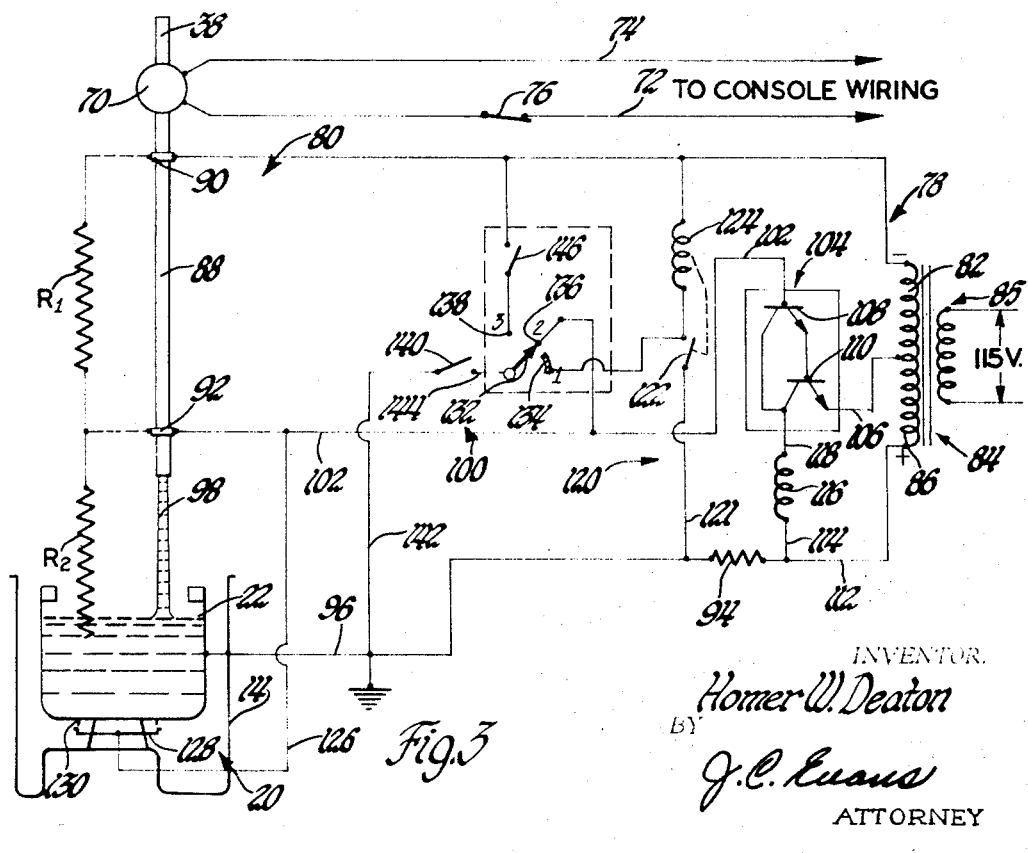
Figure 4:
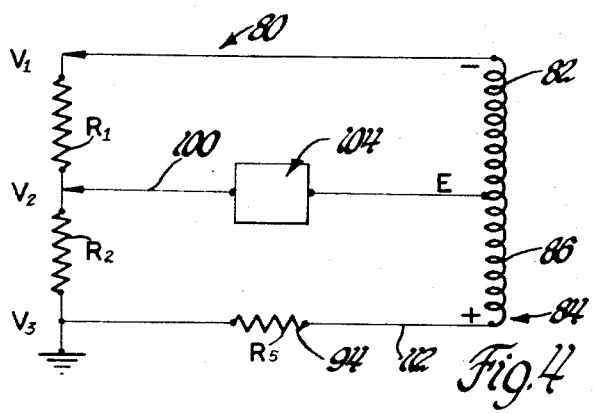
Figure 5:
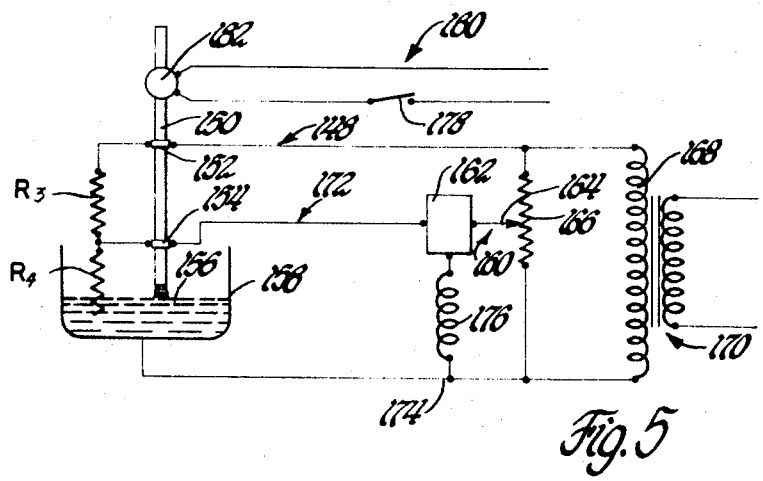
Figure 6:
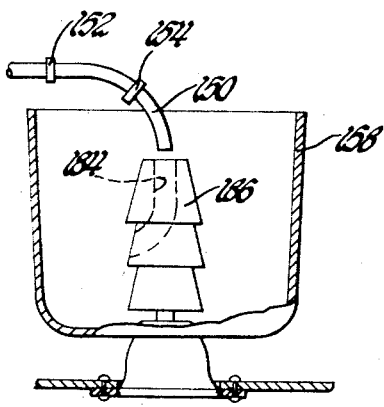

In the drawings:
FIGURE 1 is a schematic showing of clothes washing apparatus including the fluid control system of the present invention;
FIGURE 2 is a view showing an over-flow sensing component of the system shown in FIGURE 1;
FIGURE 3 is a schematic view of the control system of the present invention;
FIGURE 4 is a detailed schematic view of a bridge circuit in the system of FIGURE 3;
FIGURE 5 is a schematic view of another embodiment of the control system of the present invention; and
FIGURE 6 is a schematic fragmentary view of part of a washer including a modified agitator for use in the control system of FIGURE 3.

In FIGURE 1 of the drawings is illustrated a domestic clothes washer 10 that includes the fluid controlling system of the present invention. More particularly, the washer includes an outer casing 12 surrounding a water container 14 having a lower bulkhead 16 closing the lower end thereof to divide the space enclosed by the casing 12 into a machinery compartment 18 and a fluid receiving space 20. Within the fluid containing space 20 is located a spin tub 22. The spin tub 22 has a top opening 24 therein below a loading port 26 in the top 28 of the washer 10 that is closed by a door 30 pivotally secured to the top 28 for movement upwardly and outwardly of the top 28.

In the illustrated arrangement, the spin tub 22 is a solid tub that includes a plurality of ports 32 around the upper edge thereof through which fluid is centrifugally extracted from the tub 22 during a predetermined spin cycle of operation of the washer 10.

Fluid for use in the spin tub 22 during a washing cycle of operation is supplied thereto through a hot water solenoid valve 34 and a cold water solenoid valve 36 that are connected to a mixing and supply conduit 38 which terminates in a supply chute 40 that overlies the top opening 24 to the spin tub 22 to direct fluid into the spin tub 22 during a predetermined fill phase of the washer operation.

In the illustrated arrangement, a controller 42 is located on a rearwardly located control panel 44 of the machine and is presettable to carry-out a timer advanced sequence of operation including a fill phase washing, rinse and final spin cycles of operation.

Within the machinery compartment 18 is located a drive mechanism 46 having a vertically oriented drive shaft housing 48 that is mounted on an inverted cup-shaped support member 50 which is affixed about an opening 52 in the bottom bulkhead 16 and wherein a sealing gasket 54 is provided to produce a water tight connection between the support member 50 and the bulkhead 16.

The shaft housing 48 encloses a spin shaft 56 that is secured to the bottom 58 of the spin tub 22 by suitable fastening means such as a tub nut 60. Extending coaxially within the spin shaft 56 is an agitate shaft 62 that is secured to a vertically reciprocal agitator member 64.

Following the fill phase of operation, the mechanism 46 is conditioned to cause vertical reciprocation of the agitation shaft 62 whereby the pulsator or agitator member 64 surges cleaning fluid within the spin tub 22 through a soiled load therein. Following a predetermined washing cycle of operation, the mechanism 46 is sequentially conditioned to cause the spin shaft 56 to rotate the tub 22 at a speed to produce a centrifugal extraction of fluid therefrom through the extraction ports 32 into the fluid receiving space 20 from whence fluid is drained through an outlet conduit 66 and suitable pump means 68 exteriorly of the washer 10.

The illustrated washer is merely representative of one fluid system that is improved by the positive fill control system of the present invention.

Referring specifically to the fill phase of operation of the machine, when the controller 42 is set at the beginning of a wash cycle of operation, the hot and cold water solenoid valves 34, 36 are opened and fluid will flow through the mixing and supply conduit 38 which is illustrated in FIGURE 3 downstream of the valves 34, 36 to include a fill control valve 70 that includes electrically energizable means connectible across a power source to allow fluid flow through the conduit 38. In the illustrated arrangement, the energization circuit for the fill control valve includes conductors 72, 74 adapted to be connected across a power source and a normally closed relay controlled switch 76.

The relay controlled switch 76 is operated in accordance with certain principles of the present invention to terminate the flow of fluid through the supply conduit 38 when a predetermined fluid level occurs in the spin tub 22 that represents a sufficient quantity of fluid for cleaning a particular size of soiled load. In FIGURE 3 a control circuit 78 is illustrated that includes a bridge 80 that is shown in detail in FIGURE 4 as including a first leg constituted by the coil segment 82 of a center tapped secondary winding 84 of a control circuit power transformer 85. The bridge also includes a second leg represented by a coil segment 86 of the tapped secondary winding 84. Another leg 88 of the bridge 80 is formed by a pair of spaced apart probes 90, 92 that are embedded in the supply conduit 38 at spaced points therein to electrically connect a predetermined length of cleaning fluid flowing through the conduit 38 during the fill phase in the bridge 80. In the illustrated arrangement, the resistance of the fluid flow between the probes 90, 92 is represented as $R_1$ in the schematic diagram of FIGURE 3.

The bridge also includes a resistor 94 that is electrically connected to the end of coil segment 86 and by a conductor 96 to the outer casing 12 of the washer 10 that represents a ground potential in the control circuit 78. The column of fluid collected in the spin tub 22 also effectively constitutes a ground potential that completes the bridge 80 during a fill phase of operation through a free-falling column of fluid 98 that flows from the supply chute 40 into the interior of the spin tub 22. The column of fluid 98 has a variable length dependent upon the fluid level contained in the spin tub 22 and is designated as resistance $R_2$ in the schematic. In accordance with certain principles, moreover, the column of fluid 98 by virtue of its variable length will produce an unbalanced signal across an output circuit 100 from the bridge 80 that runs from probe 92 through a conductor 102 thence to the input terminal of a solid state amplifier circuit 104 which has a second terminal 106 thereof connected to the center tap of the secondary winding 84.

In the illustrated arrangement, the amplifier circuit more particularly constitutes a Super-Alpha-Darlington-Compound amplifier which includes a first transistor 108 having its base connected to the conductor 102, its emitter connected to the base of a second transistor 110 and its collector connected to the collector of transistor 110. The emitter of transistor 110 is electrically connected to the center tap of the secondary winding 84.

By virtue of the two transistors connected in the above described compound configuration the amplifier circuit 104 has an operating characteristic like a single transistor amplifier with an extremely high gain. Thus, depending upon unbalance in the bridge circuit 80, the amplifier circuit is operative to complete a conductive path between the collector and emitter of transistor 110 which is included within an energization circuit that when completed will operate the relay controlled switch 76 to terminate a fill operation. More particularly, when the base of the amplifier transistor 108 is positive with respect to the emitter of transistor 110, a current path will be completed from the end of coil segment 86 through a conductor 112 thence through a conductor 114 that electrically connects to one end of an electrically energizable relay coil 116 that when energized will open the relay control switch 76 in the fill circuit. The opposite end of the relay coil is connected by a conductor 118 to collectors of transistors 108, 110 and the energization circuit for the coil 116 thereby will be completed through the transistor 110 back to the center tap of the secondary winding 84.

When the base of transistor 108 is negative with respect to the emitter of transistor 110, the energization circuit for the relay coil 116 will be broken.

Additionally, the control circuit 78 includes means therein for delaying firing of the amplifier circuit 104 to produce more than one fluid level within the spin tub 22. More particularly, the delay means, for purposes of this invention will be referred to as a memory device which is illustrated in FIGURE 3 as including a network 120 within circuit 78 which runs from the outer end of coil segment 86 of the center tapped secondary winding 84 thence through conductor 112, resistor 94 thence through a conductor 121 to a relay controlled switch 122 that is operated upon energization of relay coil 124 that is connected in parallel with the resistor $R_1$ and the column of fluid 98. Further, the memory device includes a circuit for by-passing the resistance of the water column 98 including a conductor 126 having one end thereof electrically connected to the conductor 102 in the opposite end thereof electrically connected to a ring probe 128 that is electrically connected to the ground potential of spin tub 22 when water over-flows the top of the spin tub 22 so as to pass about the outer surface of the spin tub to an electrically conductive rim 130 on the under-side thereof thence across a gap between ring 130 and probe 128 which is best seen in FIGURE 2. The probe for by-passing the resistance of the column of fluid 98 will be more fully discussed in the description of the operation of the fluid level controlling circuit 78.

The circuit 78 also includes a timer switch 132 which is advanced by the sequence controlling of the washer 10 into electrical engagement with contacts 134, 136, 138 to control the energization of relay coil 124 or purposes to be discussed. In the illustrated arrangement, the energizable relay coil 116 also controls a relay controlled switch 140 that is normally opened and electrically connected by a conductor 142 to ground and by a conductor 144 to the sequentially advanced timer switch 132.

The control circuit 78 as discussed above is capable of sensing different sizes of washing loads and filling the tub to one of a plurality of levels in accordance with load size. In the case of the illustrated circuit, the fill system is able to terminate the fill phase at either the half fill or full point in the spin tube 22.

To understand the operation of the device, it is necessary to briefly discuss the electric properties of certain parts of the washer 10 during the fill phase of operation. It has been observed that the freely-falling column of water from the chute 40 to the surface of the large volume of water contained in the spin tub 22 will vary in accordance with its length even though the mass of the water may tend to spread out as it pours into the tub. Accordingly, the resistance of the water between probes 90, 92 and the resistance of the column of water 98 will depend upon their lengths. The unbalance signal from probe 92 to the base of transistor 108 will depend upon the ratio of the two resistors. Thus, in the sensing and control system of circuit 78, various ranges or resistivity found in different water sources and the like will be effectively nullified. This, the control system will be able to have good repeatability even though it is incorporated on appliances such as domestic washers that are operated with different kinds of water supply.

Another observable fact in control systems utilizing the present invention is that the potential of the fluid surface of water contained within the spin tub 22 is essentially at ground potential because the resistance of the relatively large volume of contained fluid is small even though the resistivity of the fluid may be large. Thus, as the fluid level in the spin tub increases, the resistance of the water column 98 pouring into the tub decreases directly in proportion to the decrease in the length of the column.

A further observable fact in this system is that when the size of the load is such that its upper surface is above that of the control point of one of the levels at which a fill phase is terminated, the clothes load will function to produce an indication that the tub is filled above the control level before this actually occurs. This indication is produced since with such a load, as fluid is passed into the tub, the clothe load will quickly soak-up the fluid and complete a conductive path to the ground potential of tube 22 whereby the resistance of column 98 will be represented by the distance from the water supply chute 40 to the surface of the load which produces a ratio between the fixed resistance 88 or $R_1$ and the column 98 or $R_2$ that will produce an unbalance in the bridge 80 that will condition the delay relay 124 so as to pre-condition the control circuit so that the fill phase will continue until the tub over-flows thereby to initiate the fill terminating action of the probe 128 as will be more specifically discussed. The soaking of the large size load and the resultant inversion of the ratio of the resistance $R_1$ and $R_2$ is merely discussed at this time to aid in understanding the principles of the load sensing action of the control circuit 78.

The operation of the control circuit 78 is as follows. Assuming that the tub has a load of soiled clothes that has the upper surface below the half-full point in the tub 22, when the controller 42 is positioned at the beginning of a washing cycle of operation, the relay control switch 76 is closed and the fill control valve 70 is open thereby to initiate the fluid flow through the supply conduit 30 by the supply chute to produce a freely-falling column of fluid into the spin tub 22. The timer switch blade 132 is in electrical engagement with electrical contact 134 and the resistance of the column of water 98 will exceed that of $R_1$ since the small load of clothes, even when soaked, will have the upper surface thereof at a point where the length of the column 98 will exceed the length of the water flowing between probes 90, 92. Thus, the voltage at probe 92 will be negative with respect to the emitter of transistor 110 and the coil 116 thereby is de-energized and water will continue to flow freely into the tub. After a predetermined number of timer advances, the timer switch 132 moves from contact 134 to contact 136 and the resistance of column 98 still exceeds that of $R_1$. The potential at probe 92 will still be negative and water will continue to flow to the tub until the resistance of column 98 and that of water passing between probes 90, 92 is inverted to cause probe 92 to become positive with respect to the emitter of transistor 110. This conditions the amplifier circuit 104 by imposing a forward bias thereon sufficient complete a conductive path from the collector of transistor 110 to the emitter thereof thereby to complete the energization circuit for the relay coil 116 which opens the switch 76 to de-energize the valve 70 and thus shut-off the supply of water to the spin tub 22. This will occur when the tub is at the first control level for example, at a point exactly half-filled.

Assuming that the tub 22 initially is more than half-filled with the load size, this increased load size will be sensed by the control circuit 78 in the following manner. When the circuit is energized, the timer will be in its first position and the ratio of the resistance of the water column 98 to the length of fluid between probes 90, 92 will cause the voltage at probe 92 to be negative with respect to the amplifier circuit emitter. However, as soon as the clothes are soaked with water, the water column, as discussed above, appears to be shorter than the length of water between the probes 90, 92 since the upper surface of the large load is at ground potential. Accordingly, the ratio of the resistance between the column of water 98 and $R_1$ is inverted causing the probe 92 to have a voltage positive with respect to the emitter of the amplifier circuit emitter thereby biasing the circuit 104 to cause current flow between the collector and emitter of 110 thereby to energize coil 116 and open the switch 76 to close valve 70 and terminate the water fill.

This initial termination of water fill is only momentary since the timer is still in the first position and the relay coil 124 will be energized since the normally opened relay switch 140 is closed to energize coil 124 across the coil 84. This causes the relay controlled switch 122 to complete a holding circuit for the coil 124 across a segment of the bridge 80 representing a preconditioning of the bridge 80 so that it will thereafter operate to assure substantially complete filling of the tub with such fill representing a quantity of cleaning fluid capable of adequately extracting soil from the larger sized load. Because of the physical disposition of the large size clothes load and since the coil 124 shunts a segment of the bridge 80, the impedance of the secondary winding 84 and the resistance of resistor 94 form a voltage divider that produces a voltage at the spin tub close to the voltage of the emitter of the amplifier circuit. Thus, the potential in probe 92 will be negative with respect to the emitter so that the amplifier will be turned off and the relay coil 116 de-energized. Thus, water will flow into the tub again. To unbalance the bridge in the positive direction, it is necessary to effectively short-circuit the resistance of the column 98 from the circuit to produce a negative potential capable of terminating the fill phase of operation with such a large load. This occurs when water over-flows the tub at full fill. The water will bridge the gap between rim 130 and probe 128 as seen in FIGURE 2 to create the aforementioned short circuit. Following such fill termination, the spinning of tub 22 clears probe 128 of any water, or dirt; and the probe 128 is also located high enough in the bulkhead to be unaffected by water standing in space 20 following pump out.

Another feature of the present invention is that the timer during an over-flow rinse operation wherein fill water is intended to flow over the upper edge of the tub into the fluid receiving space 20, the timer switch 132 is moved into electrical engagement with a conductor 138 and a timer switch 146 is closed thereby making the potential of probe 92 that of probe 90. This nullifies the effect of the over-flow sensing probe 128 so that water will continue to pour into the space 20 as much as necessary in this part of the cycle which is terminated by opening of the timer contact 146.

In the embodiment of the invention illustrated in FIGURES 1 through 4, the positive fill system controls to first and second fluid levels within the tub 22. In order to control the fluid level infinitely within predetermined limits in the embodiment of FIGURE 5 a bridge circuit 148 is illustrated like bridge circuit 80 that includes a first leg defined by the length of fluid bounded by a supply conduit 150 between electrically conductive probes 152, 154 having a resistance $R_3$. The bridge circuit further includes another leg defined by a freely-falling column of fluid 156 that has a variable resistance $R_4$ corresponding to the length of the column 156 between the probe 154 and the surface of fluid collected within a water container 158 corresponding to the spin tube 22 in the first embodiment.

The bridge 148 further includes an adjustable potentiometer 160 connected to the output emitter from an amplifier circuit 162 corresponding to circuit 104 in the first embodiment. The potentiometer 160 includes a movable contact carrying arm 164 and a resistance 166 connected across the ends of a secondary winding 168 of a power transformer 170.

The illustrated bridge 148 has an output circuit 172 therefrom connected from probe 154 to the input base of the amplifier circuit 162 and when the amplifier circuit 162 is forwardly biased an energization circuit is completed from one end of the secondary winding 168 thence through a conductor 174 and a relay controlling coil 176 that is energized from the collector to emitter of the second stage transistor within the amplifier 162 when it is biased as mentioned above.

The energized coil 176 will open a relay controlled switch 178 in an energization circuit 180 for a solenoid operated flow regulating valve 182 that will terminate flow to the container 158 when the bridge has a predetermined unbalanced signal across the output circuit 172.

By virtue of the above illustrated embodiment of the invention, the contact carrying arm 164 can be variably positioned with respect to resistance 166 to effect a predetermined preconditioning of the bridge 148 that will result in a given ratio of resistances between $R_1$ and $R_2$ that will be required to unbalance the bridge 148 to terminate a fill phase of operation.

It will be appreciated that a predetermined ratio of resistances for unbalance will depend upon the location of the contact carrying arm 164 and accordingly, the above illustrated circuit will be capable of varying the point at which the fill phase of operation is terminated corresponding to an infinite number of fluid levels within the container 158 between a completely empty and completely filled state therein.

In order to prevent a premature termination of the fill phase of the type discussed in the first embodiment of the invention which tends to occur when a load of a particular size becomes soaked with cleaning fluid, in systems utilizing the circuit of FIGURE 5, it is preferable that the fill hose or conduit 150 discharge through an interior opening 184 within a centrally located agitator or pulsator 186 that shields the load of clothes from the fill fluid. As a result, the resistance of the freely-falling column of water will depend upon the actual surface level within the container 158 and biasing of the amplifier circuit 162 in the bridge 148 will only occur upon the water level in the container 158 reaching a point as preset by adjustment of the movable contact carrying arm 164 of potentiometer 160.

While the embodiment of the present invention as herein disclosed constitutes a preferred form it is to be understood that other forms might be adopted.

What is claimed is as follows:

1. A fluid level control system comprising a fluid container, means for directing a column of water into said container including a supply conduit, fluid control means for terminating fluid flow through said conduit, and means sensing the electrical resistance of a column of fluid from the end of the supply conduit to the level of fluid within said container and responsive thereto for conditioning said fluid control means to terminate water fill when said level reaches a predetermined height.

2. A fluid sensing and control system comprising a fluid container, means for supplying fluid to said container including a conduit having an open end disposed in spaced relationship to the interior of said container, regulating means for varying fluid flow through said conduit end interiorly of said container, means for sensing the electrical resistance of a length of a fluid column from said conduit outlet to the fluid level in said container, and means responsive to a predetermined height of said fluid column to condition said regulating means to terminate flow through said conduit when the fluid level in said container reaches a predetermined point.

3. In a fluid sensing and control system the combination of fluid container means including a conduit for directing fluid into said container, said conduit including a fill opening located in spaced relationship to said container, bridge means having a first leg formed by fluid flowing through a predetermined length of said conduit, a second leg formed by a fluid column between said fill opening and the fluid level in said container, and means for producing a signal in accordance with the ratio of electrical resistance in said first and second legs, valve means for terminating fluid flow through said conduit, and means responsive to said signal for operating said valve means when said signal reflects a predetermined level of fluid within said container.

4. In a fluid sensing and control system the combination of means forming a fluid container, means for directing fluid into said container including means forming a free-falling column of fluid having a length varying in accordance with the level of fluid within said container, means for sensing the resistance of said free-falling column during a first predetermined fill period for sensing the effective length of said column from said flow means to a ground potential, probe means for terminating fluid flow into said container independently of said free-falling column of fluid, means for maintaining fluid flow into said container following said first fill period sufficient to completely fill said container when said effective length of said column of fluid during said first fill period is of a predetermined length, said fluid flow terminating probe means being operative once said container is filled to terminate fluid flow into said container.

5. A fluid sensing and control system comprising a container, fluid supply means for supplying fluid to said container including means forming a free-falling column of fluid into said container, control means terminating fluid flow into said container when said container is filled to first and second levels, and means for sensing the free-falling length of said column to condition said control means to select one or the other of said fill levels.

6. In the combination of claim 5, said control means including bridge means having a first leg formed by an enclosed column of fluid flowing into said container and a second leg formed by the free-falling column of fluid, said bridge means including means for comparing the ratio of electrical resistances of said first and second legs and operative to terminate fluid flow into said container at one of the fluid levels therein when said ratio is of a predetermined magnitude.

7. In the combination of claim 5, said fluid supply means including a conduit having a fill opening forming said free-falling fluid column, said control means including bridge means having a first leg formed by a length of fluid flowing through said conduit and a second leg formed by said free-falling column of fluid, and means for sensing the ratio of electrical resistance between said legs for terminating fluid flow through said conduit.

8. In the combination of claim 7, said bridge means sensing the ratio of resistances of said first and second legs upon an initial filling of said container, means responsive to the initial ratio of resistances of said legs to maintain fluid flow through said conduit until said container is filled, and means for terminating fluid flow when said container is filled.

9. In the combination of claim 7, said bridge means including means for varying the predetermined level of each of said two fill levels.

10. In the combination of claim 8, said means for terminating fluid flow when said container is filled including means responsive to fluid over-flowing said container.

11. In the combination of claim 10, said means responding to over-flowing of fluid from said container including an electrically conductive probe and means for electrically connecting said probe to said bridge means for electrically shunting said free-falling column of fluid from said bridge thereby to condition said bridge means to terminate fluid flow into said container.

12. A system for varying the level of fill fluid in washing apparatus comprising a container adapted for receiving a soiled load and cleaning fluid, means for supplying a cleaning fluid to said container including a fill conduit having a supply nozzle forming a free-falling fluid column into said container during a fill operation, means for initiating a fill phase of operation, valve means operable upon initiation of the fill phase to flow fluid through said conduit means to form a column of fluid flowing into said container, means including said column of fluid for sensing the size of a soiled load within said container, and control means responding to a predetermined sensed load to maintain a predetermined fill period in accordance with changes in the electrical resistance of said free-falling fluid column.

13. In the combination of claim 12, said control means including relay means, amplifier means energizing said relay means, means responsive to variations in the resistance of said free-falling fluid column for conditioning said amplifier means to energize said relay coil to terminate the fill phase of operation.

14. A system for varying the level of fill fluid in washing apparatus comprising a container adapted for receiving a soiled load and cleaning fluid, means for supplying a cleaning fluid to said container including a fill conduit having a supply nozzle forming a free-falling fluid column into said container during a fill operation, means for initiating a fill phase of operation, valve means operable upon initiation of the fill phase to flow fluid through said conduit means to form a column of water in said container, and control means for maintaining a predetermined fill period in accordance with changes in the electrical resistance of said free-falling fluid column.

15. In the combination of claim 14, means for shielding said fluid column from soiled clothes until said fluid reaches the bottom of said container.

References Cited

UNITED STATES PATENTS

| | | | |
|---|---|---|---|
| 3,285,275 | 11/1966 | Couffer et al. | 137—392 |
| 3,339,578 | 9/1967 | Smith | 137—392 |
| 3,362,334 | 1/1968 | Ramsay | 137—392 X |

WILLIAM S. BURDEN, *Primary Examiner.*